(12) United States Patent
Bruckhaus et al.

(10) Patent No.: US 8,606,644 B1
(45) Date of Patent: Dec. 10, 2013

(54) ORDER QUEUE MANAGEMENT IN EVENT TICKET NETWORK SYSTEMS

(75) Inventors: Tilmann Bruckhaus, Cupertino, CA (US); James A. Scheinblum, San Francisco, CA (US)

(73) Assignee: Eventbrite, Inc., San Francisco, CA (US)

( * ) Notice: Subject to any disclaimer, the term of this patent is extended or adjusted under 35 U.S.C. 154(b) by 34 days.

(21) Appl. No.: 13/325,771

(22) Filed: Dec. 14, 2011

(51) Int. Cl.
*G06Q 30/00* (2012.01)

(52) U.S. Cl.
USPC ........................................................ 705/26.1

(58) Field of Classification Search
USPC ........................................................ 705/26.1
See application file for complete search history.

(56) References Cited

U.S. PATENT DOCUMENTS

2012/0330697 A1* 12/2012 Smith et al. ...................... 705/5

* cited by examiner

Primary Examiner — Mila Airapetian
(74) Attorney, Agent, or Firm — Baker Botts L.L.P.

(57) ABSTRACT

In particular embodiments, a method includes receiving a request to purchase tickets for an event from a user, and associating the request with a queue workflow or a termination workflow based on an application of a probabilistic model, where the inputs to the probabilistic model may include the number of tickets requested by the user, the total number of tickets that other users are requesting to purchase, and the current number of tickets available for the event.

18 Claims, 5 Drawing Sheets

ORDER QUEUE MANAGEMENT IN EVENT TICKET NETWORK SYSTEMS

TECHNICAL FIELD

The present disclosure generally relates to online event management systems and methods for managing ticket sales.

BACKGROUND

Many websites allow users to conduct a variety of actions online, such as view content, write reviews, order items, organize events, etc. These websites often present the user with a plurality of actions to choose from and allow the user to select the type of action he would like to perform. Once the action is selected, the website typically redirects the client system of the user to a webpage where the action can be completed. For example, some websites allow users to purchase tickets for an event. An online ticket purchasing system may allow an event organizer to sell a greater number of tickets in an efficient manner, such as, for example, issuing electronic tickets that are instantly delivered to the purchaser and handling high-volume purchase transactions. An online ticket purchasing system may also allow users to view event listings, register for events, and purchase additional event-related services and/or products. Online systems, such as online ticket purchasing systems, can typically be accessed using suitable browser clients (e.g., Firefox, Chrome, Internet Explorer).

DESCRIPTION OF EXAMPLE EMBODIMENTS

Online ticket purchasing systems may strive to maximize tickets sales while also providing a favorable user experience. Meeting these demands while attempting to process a high volume of ticket sales (e.g., for a popular event) can be problematic if the system has processing limitations. Particular users attempting to register for an event or purchase tickets for an event may be forced to wait while the system processes orders from other users. Some of these users may be unable to purchase tickets after waiting because the event sells out. Alternatively, particular users may be turned away when the system incorrectly determines that an event has sold out or will sell out based on the current requests to purchase tickets or register for an event the system is processing. Practical computer system limitations may also make it necessary to limit the number of user sessions entering a workflow to purchase tickets because sessions in a workflow to purchase tickets typically consume a significant amount of computing resources. These situations may cause an unfavorable user experience that the operator of the online ticket purchasing system may want to avoid.

System Overview

Figure 1:
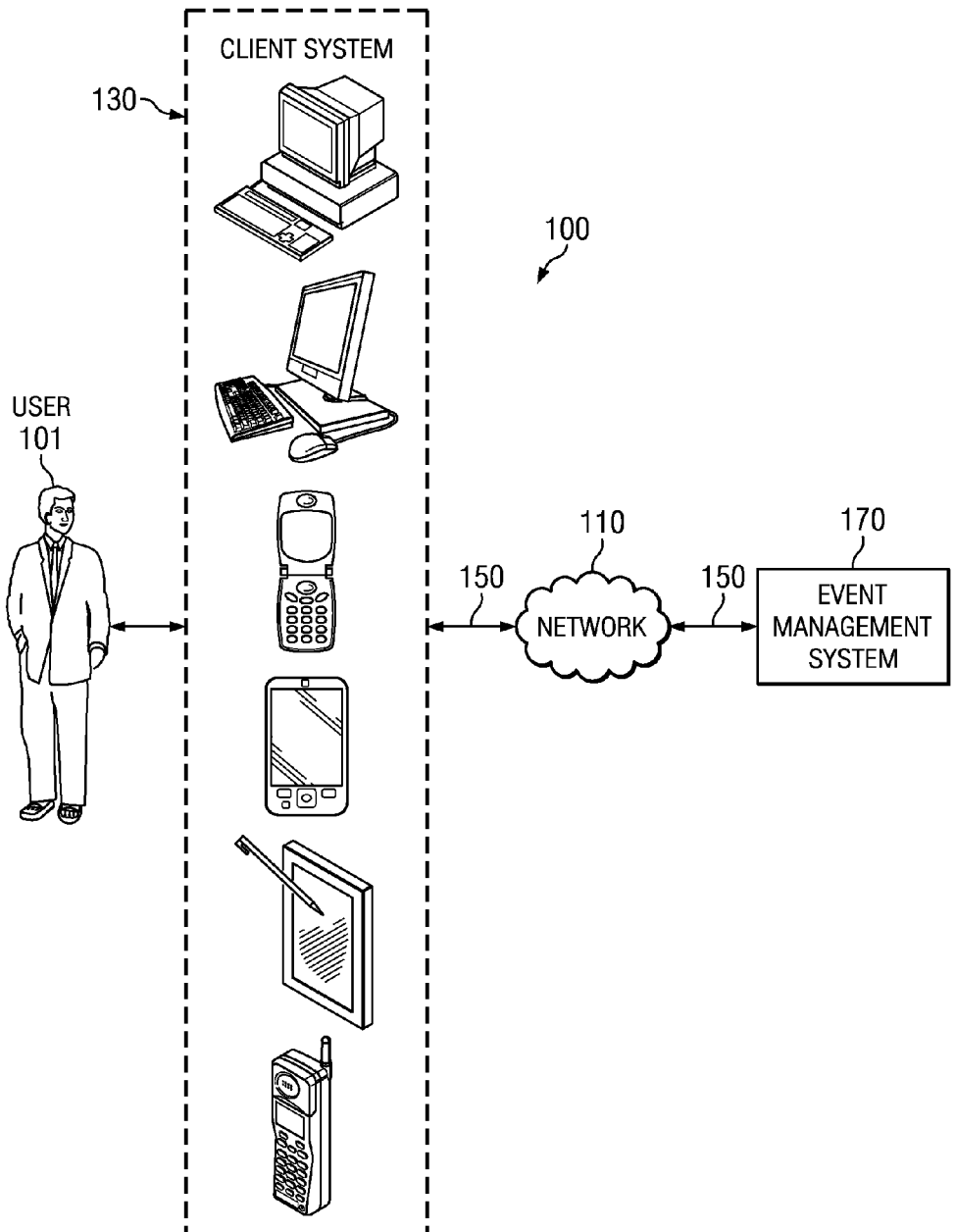
FIG. 1 illustrates an example system for implementing an online event management system.

FIG. 1 illustrates an example system 100 for implementing an online event management system. System 100 includes a user 101, a client system 130, and an event management system 170 connected to each other by a network 110. Although FIG. 1 illustrates a particular arrangement of user 101, client system 130, event management system 170, and network 110, this disclosure contemplates any suitable arrangement of user 101, client system 130, event management system 170, and network 110. As an example and not by way of limitation, two or more of client system 130 and event management system 170 may be connected to each other directly, bypassing network 110. As another example and not by way of limitation, two or more of client system 130 and event management system 170 may be physically or logically co-located with each other in whole or in part. Moreover, although FIG. 1 illustrates a particular number of users 101, client system 130, event management systems 170, and networks 110, this disclosure contemplates any suitable number of users 101, client systems 130, event management systems 170, and networks 110. As an example and not by way of limitation, system 100 may include multiple users 101, client systems 130, event management systems 170, and networks 110.

In particular embodiments, an event management system 170 may be a network-addressable computing system that can host one or more event organization and management systems. An event management system 170 may generate, store, receive, and transmit event-related data, such as, for example, event listings, event details, event history details, event registration details, event organizer details, event attendee details, ticket purchase details, attendee check-in details, and event displays. An event management system 170 may be accessed by the other components of system 100, either directly or via network 110. In particular embodiments, one or more users 101 may use one or more client systems 130 to access, send data to, and receive data from an event management system 170. A client system 130 may access an event management system 170 directly, via network 110, or via a third-party system. A client system 130 may be any suitable computing device, such as, for example, a personal computer, a laptop, a cellular phone, a smartphone, a personal digital assistant, an ultra-mobile PC, or a computing tablet.

Network 110 may be any suitable communications network. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Connections 150 may connect client system 130 and event management system 170 to communication network 110 or to each other. This disclosure contemplates any suitable connections 150. In particular embodiments, one or more connections 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)) or optical (such as for example Synchronous Optical Network (SONET) or Synchronous Digital Hierarchy (SDH)) connections. In particular embodiments, one or more connections 150 each include an ad hoc network, an intranet, an extranet, a VPN, a LAN, a WLAN, a WAN, a WWAN, a MAN, a portion of the Internet, a portion of the PSTN, a cellular telephone network, another connection 150, or a combination of two or more such connections 150. Connections 150 need not necessarily be the same throughout system 100. One or more first connections 150 may differ in one or more respects from one or more second connections 150.

Event Management Systems

In particular embodiments, an event management system 170 may allow users 101 to organize and manage events. An event may be, for example, a party, a concert, a conference, a sporting event, a fundraiser, a networking event, or a live performance. Events may occur online (such as, for example, a web-based seminar) and offline (such as, for example, a live seminar in a lecture hall). An event management system 170 may allow an event organizer (e.g., user 101) to organize and manage various aspects of an event, such as, for example, managing attendee registrations and selling tickets, managing funds from ticket sales, promoting the event, or managing attendee check-in at the event. An event management system 170 may also allow event attendees (e.g., users 101) to view and manage various aspects of registering for an event, such as, for example, viewing event listings, viewing event information, viewing event history information, registering for events, or purchasing tickets for events. As an example and not by way of limitation, a first user may use event management system 170 to organize an event. The first user may input event information associated with the event to create an event listing on event management system 170. One or more second users may then use event management system 170 to view the event listing and register for the event, such as, for example, by purchasing tickets for the event. As used herein, the terms "registering for an event" and "purchasing tickets for an event" may be used interchangeably. Although this disclosure describes particular types of events, this disclosure contemplates any suitable types of events. Moreover, although this disclosure describes organizing and managing particular aspects of an event, this disclosure contemplates organizing and managing any suitable aspects of an event.

In particular embodiments, an event management system 170 may have an event listing associated with each event managed by the system. An event listing may be hosted on event management system 170, such as, for example, on a particular webpage associated with the event listing. An event listing may be accessed and displayed by any suitable client system 130, such as, for example, by accessing the particular webpage associated with the event listing. An event listing may have an event information associated with the event listing. Event information may include information describing the event date, type, cost, organizer, promoter, geographic location, venue, performer, tickets, ticket identifiers, attendees, attendee check-in status, and other suitable event information. Although this disclosure describes particular types of event information, this disclosure contemplates any suitable types of event information. An event listing may also have a payment information associated with the event listing. Payment information may include the address verification system score for the payments for the event, the credit cards used to pay for the event, the locations of payers, the IP addresses of the payers, the number and amount of prior payouts to the event organizer, and other suitable payment information. Although this disclosure describes particular types of payment information, this disclosure contemplates any suitable types of payment information. An event listing may also have a purchase information associated with the event listing. Purchase information may include any billing information, shipping information, or other suitable information needed from user 101 to register for an event or purchase tickets for an event. Although this disclosure describes particular types of purchase information, this disclosure contemplates any suitable types of purchase information.

In particular embodiments, the event information associated with an event listing may include an event attendee list. The event attendee list may include information describing one or more of the attendees registered to attend the event, include the attendee's name, phone number, mailing address, email address, payment information, ticket order information, ticket information, check-in status, and other suitable attendee information. Each attendee may be assigned one or more tickets, and each ticket may have a unique ticket identifier. A ticket identifier may be an identification number, a barcode, a 2D barcode, a QR code, or another suitable unique identifier. The event attendee list may also include information describing the check-in status of an attendee. Check-in status may indicate whether an attendee is or is not checked-in at the event. As an example and not by way of limitation, the check-in status of an attendee may indicate the attendee is checked-in after the attendee arrives at the event and provides a ticket to an event organizer. Although this disclosure describes particular types of information associated with an event attendee list, this disclosure contemplates any suitable types of information associated with an event attendee list.

In particular embodiments, each user 101 of event management system 170 may have an event history information associated with the user 101. Event history information may include event information and payment information associated with one or more events a user 101 has attended or has registered to attend, as well as purchase history information associated with the event. Event history information may also include event information and payment information associated with one or more event listings a user 101 has created, organized, and managed. Although this disclosure describes particular event history information, this disclosure contemplates any suitable event history information.

In particular embodiments, the event management system 170 may use unique client identifiers to identify a user 101. As an example and not by way of limitation, the event management system 170 may assign a unique client identifier to each client system 130. The event management system 170 may assign each client system 130 with an unique client identifier based on the IP address of the client system 130, tracking cookies on the client system 130 (which may be appended to HTTP requests transmitted by the client system 130), the serial number or asset tag of the client system 130, or other suitable identifying information. As another example and not by way of limitation, the event management system 170 may assign a unique client identifier to each user 101, which the user must provide to the event management system 170 via a client system 130. The event management system 170 may assign each user 101 with a username and password that the user 101 can input into client system 130, which then transmits the username and password to the event management system 170. In particular embodiments, the event management system 170 can use the unique client identifier to determine that the user 101 is accessing the system.

In particular embodiments, the event management system 170 may maintain an event management account for a user 101. The event management account may contain a variety of user information about the user 101. As an example and not by way of limitation, user information may include personal information (such as, for example, name, sex, location, and interests), social network information (such as, for example, friend connections), financial information (such as, for example, income and credit history), event history information (such as, for example, the type, data, cost, venue, performers, and geographic location of the events a user 101 has organize, registered for, or attended), user account information (such as, for example, preferred status, temporary trial status, free status, and paid status), and other suitable information related to the user 101. User information may also include information related to the funds collected by event management system 170 from ticket sales for event listings created by the user 101, and information related to funds paid out to the user 101. Although this disclosure describes event management accounts containing particular types of information about a user 101, this disclosure contemplates event management accounts containing any suitable information about a user 101. Moreover, although this disclosure describes user information including particular types of information about a user 101, this disclosure contemplates user information containing any suitable information about a user 101.

In particular embodiments, an event management system 170 may use a "shopping cart" model to facilitate registering for an event. As an example and not by way of limitation, event management system 170 may present a user 101 with a plurality of event listings. The user 101 may select one or more of the events to register for. For each event, the user 101 may also select the number of attendees the user is registering for the event. When the user 101 selects an event listing on event management system 170, the event management system 170 metaphorically adds that item to a shopping cart. When the user 101 is done selecting event listings, then all the items in the shopping cart may be "checked out" (i.e., ordered) when the user 101 provides billing information (and possibly shipment information). Billing information may include the user 101's name, address, credit card information, bank account number, PayPal username, and other suitable billing or payment information. In some embodiments, when a user 101 selects an event listing, then that event listing is "checked out" by automatically prompting the user for the billing and shipment information. The user 101 then may be presented with a registration webpage that prompts the user for the user-specific registration information to complete the registration. That webpage may be prefilled with information that was provided by the user 101 when registering for another event or when establishing a user account on event management system 170. The information may then be validated by event management system 170, and the registration may be completed. At this point, the user 101 may be presented with a registration confirmation webpage that displays the details of the event and registration details. Event management system 170 may also charge or withdraw funds from a financial account associated with user 101 based on the billing information provided by the user 101. Although this disclosure describes particular means for registering for events, this disclosure contemplates any suitable means for registering for events. As an example and not by way of limitation, event management system 170 may use any suitable electronic commerce model to facilitate registering for an event.

In particular embodiments, a user 101 may register for an event by purchasing a ticket for the event. A user 101 may purchase tickets for an event for himself or others. Each ticket purchase order may be associated with a particular order identifier, which may be any suitable identifying information. A user 101 may purchase one or more tickets to an event for one or more attendees. Each ticket may be associated with a particular attendee. Each attendee may be associated with a particular attendee identifier, which may be any suitable identifying information. Therefore, each order identifier may be associated with one or more attendee identifiers. Each attendee may be associated with one or more tickets. Therefore, each attendee identifier may be associated with one or more ticket identifiers. In particular embodiments, the ticket identifier is a particular barcode number. A user 101 may select particular number and type of tickets to purchase for an event. As an example and not by way of limitation, the user 101 may request to purchase n tickets to an event. The user may also select particular types of tickets to purchase, such as, for example, premium tickets, general admission tickets, reserved seating tickets, another suitable type of tickets, or two or more such types of tickets. Although this disclosure describe a user 101 purchasing tickets for an event in a particular manner, this disclosure contemplates a user 101 purchasing tickets for an event in any suitable manner.

Order Queue Management

In particular embodiments, event management system 170 may use an order queue management system to facilitate registering for an event or purchasing tickets for an event. As an example and not by way of limitation, event management system 170 may use an order queue management system when a high number of users are requesting to register for an event or to purchase tickets for an event. An event organizer or operator of event management system 170 may want to maximize ticket sales or the rate of ticket sales by allowing event management system 170 to process as many requests to purchase tickets as possible by associating as many requests as possible with an in-process workflow where the users 101 can purchase tickets. This may result in a volume of requests to purchase tickets that is greater than the processing capacity of system 100. As an example and not by way of limitation, the volume of request to purchase tickets may be greater than the processing limit of event management system 170, network 110, another suitable system, or two or more such systems. When system 100 has reached its processing capacity for processing requests to purchase tickets for an event, additional requests may be queued to a queue workflow until additional processing resources are available on system 100. However, this may result in particular users 101 waiting long periods of time with an expectation to purchase tickets. Although some users 101 may have their requests to purchase tickets for the event moved from a queue workflow to an in-process workflow, other users 101 may have their request denied because the event has sold out. Thus, it may be undesirable to have users 101 placed in queue workflows and then have those same users 101 be unable to purchase tickets after a long wait because of the resulting negative shopping experience. In particular embodiments, event management system 170 may avoid associating requests to purchase tickets with a queue workflow when it determines that it is unlikely that tickets will be available for the event by the time a request is transferred from the queue workflow to the in-process workflow. As an example and not by way of limitation, event management system 170 may apply a probabilistic model to determine whether a request to purchase tickets for an event from a user 101 should be associated with an in-process workflow, a queue workflow, a termination workflow, or another suitable workflow based on the probability of success that tickets will be available for the user 101 to purchase. One goal of system 100 may be to minimize the number of users 101 admitted into a queue workflow while still allowing enough users 101 to access an in-process workflow so that an event may sellout. The system 100 may determine whether to place another user 101 in a queue workflow based on the probability that the event will sellout without admitting additional users 101 into the queue workflow. The threshold probability may be based on a user-defined value. If more users 101 are needed to reach the desired probability of selling out then additional users 101 may be admitted to the queue workflow. The system 100 may periodically or continually reevaluate the probability of selling out the event as time passes and some users 101 successfully purchase tickets while other users 101 let their sessions expire without completing a successful order. If the number of users 101 who are in the queue workflows and in-process workflows who complete successful orders is lower than estimated by a probabilistic model, then the system 100 may admit additional users 101 into the queue workflow. If the number of successful orders is greater than expected and the event sells out while some users 101 are still in the queue workflow, the users 101 remaining in the queue workflow may be removed from the queue workflow and directed to a termination workflow, where the user 101 may receive an appropriate message. Although this disclosure describes using a particular order queue management system to facilitate registering for an event or purchasing tickets for an event in a particular manner, this disclosure contemplates using any suitable order queue management system to facilitate registering for an event or purchasing tickets for an event in any suitable manner.

In particular embodiments, event management system 170 may associate a request to purchase tickets for an event with an in-process workflow. An in-process workflow may allow a user 101 to register for an event or purchase tickets for an event. Once a request from a user 101 is associated with an in-process workflow, the user 101 may purchase one or more tickets by successfully completing on order, or the user 101 may not purchase tickets if the user 101 cancels the request, or allows the session in the in-process workflow to expire or time-out. In particular embodiments, an in-process workflow may comprise registering one or more attendees for an event using a shopping cart model or another suitable electronic commerce model. As an example and not by way of limitation, once a request to purchase tickets for an event from a user 101 has been associated with an in-process workflow, the user 101 may input billing information for user 101 or one or more other attendees. The event management system 170 may also access event history information associated with the user 101, event information associated with the event, user information associated with the user 101, or other suitable information. After the user 101 has completed registering for the event or purchasing tickets for the event, event management system 170 may update the event attendee list associated with the event to include user 101 or one or more other attendees. In particular embodiments, event management system 170 may only be able to simultaneously process a number of requests to purchase tickets equal to the process limit of the system. The process limit for event management system 170 may be based on the processing capacity of event management system 170, the transmission capacity of network 110, or another suitable processing capacity. In particular embodiment, event management system 170 may have a process limit of L requests to purchase tickets. If event management system 170 is currently processing L requests to purchase tickets from L users 101, then event management system 170 may have zero open in-process workflows and therefore be unable to process any additional requests to purchase tickets until one or more of the L request to purchase tickets is completed. In this case, newly receive requests to purchase tickets may be associated with a different workflow (such as, for example, a queue workflow or a termination workflow) until there is an open in-process workflow available. However, if event management system 170 is currently processing q<L request to purchase tickets from q users 101, then event management system 170 may have one or more open in-process workflows (in this case, the number of open in-process workflows would be equal to L−q) and therefore be able to associate one or more newly received requests to purchase tickets with an open in-process workflow. Event management system 170 may decrement the number of open in-process workflows in response to the request being associated with an open in-process workflow. Although this disclosure describes a particular in-process workflow comprising particular steps, this disclosure contemplates any suitable in-process workflow comprising any suitable steps. Moreover, although this disclosure describes implementing an in-process workflow in a particular manner, this disclosure contemplates implementing an in-process workflow in any suitable manner.

In particular embodiments, event management system 170 may associate a request to purchase tickets for an event with a queue workflow. A queue workflow may allow a user 101 to wait to register for an event or purchase tickets for an event while event management system 170 is processing other requests to register for an event or purchase tickets for an event (such as, for example, requests received prior to the user 101's request). Thus, the queue workflow allows a user 101 to wait to enter an in-process workflow. As an example and not by way of limitation, event management system 170 may associate a request to purchase tickets to an event from a user 101 to a queue workflow if there are no open in-process workflows available. In particular embodiments, event management system 170 may associate a request to purchase tickets for an event from a user 101 to a queue workflow if the request has an order success probability above a threshold determined by applying a probabilistic model. The order success probability for a particular user 101 is the probability that the user 101 will be able to successfully purchase tickets for an event, such as, for example, being able to purchase tickets for an event before it sells out. As an example and not by way of limitation, a request to purchase tickets from a user 101 may remain associated with a queue workflow until an open in-process workflow is available, until the user 101's session expires, until no further tickets are available for sale, or as long as the order success probability for the request to purchase tickets from the user 101 is above a threshold determined by applying a probabilistic model. In particular embodiments, event management system 170 may periodically update the number of open in-process workflows or the order success probability for a request to purchase tickets and then reevaluate whether to transfer the request to another workflow. As an example and not by way of limitation, if event management system 170 determines that an open in-process workflow becomes available, the system may transfer a request to purchase tickets to an event from a queue workflow to an open in-process workflow. As another example and not by way of limitation, if event management system 170 determines that the order success probability for a request to purchase tickets has dropped below a threshold determined by applying a probabilistic model, the system may transfer the request to purchase tickets to an event from the queue workflow to a termination workflow. Event management system 170 may update the number of open in-process workflows or the order success probability for a request to purchase tickets based on a variety of factors, such as, for example, the number of new requests to purchase tickets received by the system, the duration that each pending request has been associated with a queue workflow or an in-process workflow, event information for the event, user information for one or more users 101 that transmitted the requests, other suitable factors, or two or more such factors. Although this disclosure describes a particular queue workflow comprising particular steps, this disclosure contemplates any suitable queue workflow comprising any suitable steps. Moreover, although this disclosure describes implementing a queue workflow in a particular manner, this disclosure contemplates implementing a queue workflow in any suitable manner.

In particular embodiments, event management system 170 may associate a request to purchase tickets for an event with a termination workflow. A termination workflow may terminate, cancel, or deny a request to purchase tickets for an event and inform a user 101 that his request to purchase tickets to an event has been terminated, cancelled, or denied. As an example and not by way of limitation, event management system 170 may associate a request to purchase tickets to an event from a user 101 with a termination workflow if there are no available tickets to the event. As another example and not by way of limitation, event management system 170 may associate a request to purchase tickets to an event from a user 101 with a termination workflow if the order success probability for the request is below a threshold determined by applying a probabilistic model. In particular embodiments, after associating a request to purchase tickets from a user 101 with a termination workflow, event management system 170 may transmit information to the user 101 that the event is sold out, that the user should submit a new request at a later time, that the number or type of tickets the request are not available, or other suitable information. Although this disclosure describes a particular termination workflow comprising particular steps, this disclosure contemplates any suitable termination workflow comprising any suitable steps. Moreover, although this disclosure describes implementing a termination workflow in a particular manner, this disclosure contemplates implementing a termination workflow in any suitable manner.

Figure 2A:
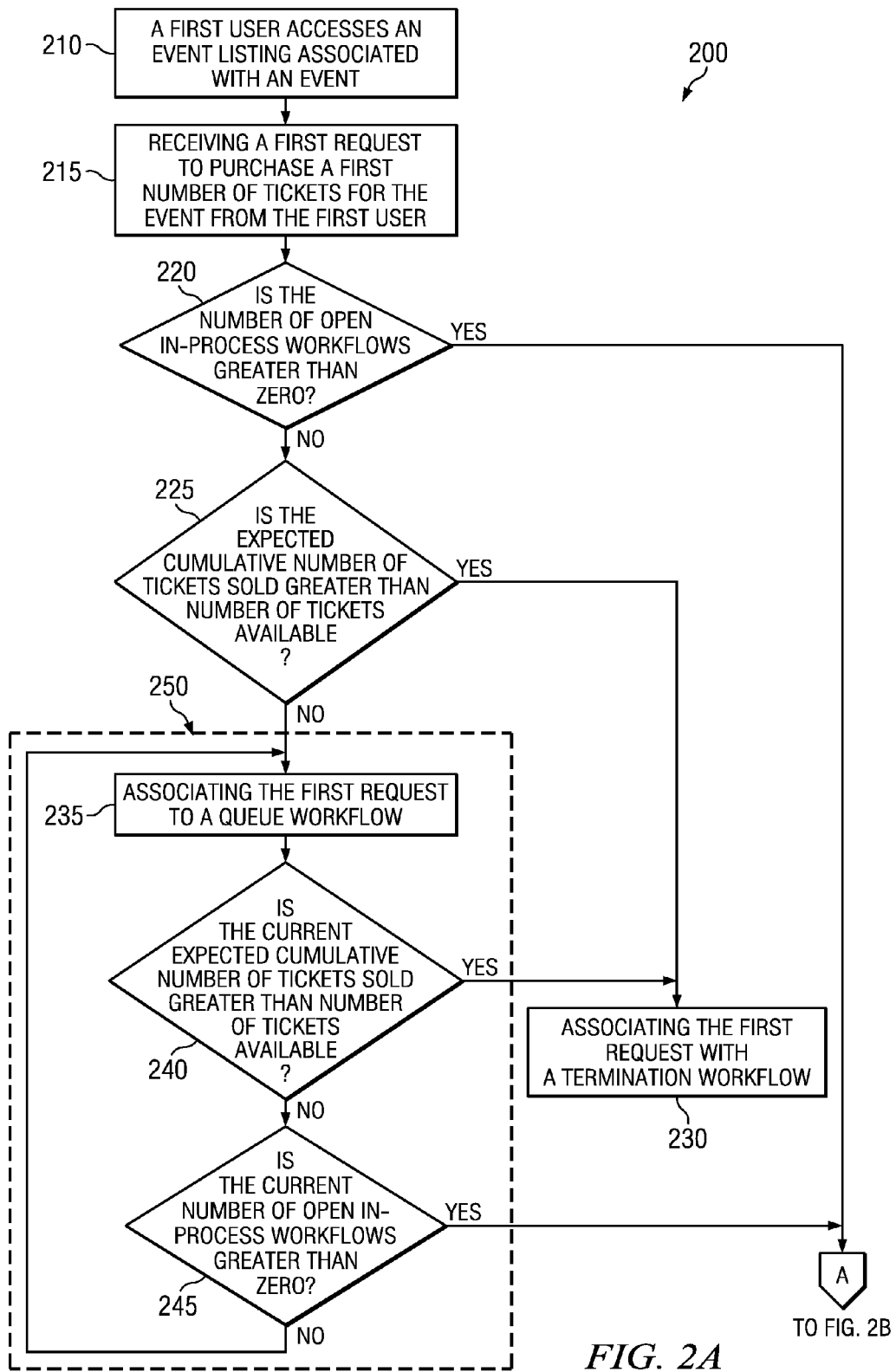
FIGS. 2A-2B illustrate an example method for managing an online ticket purchasing system.
Figure 2B:
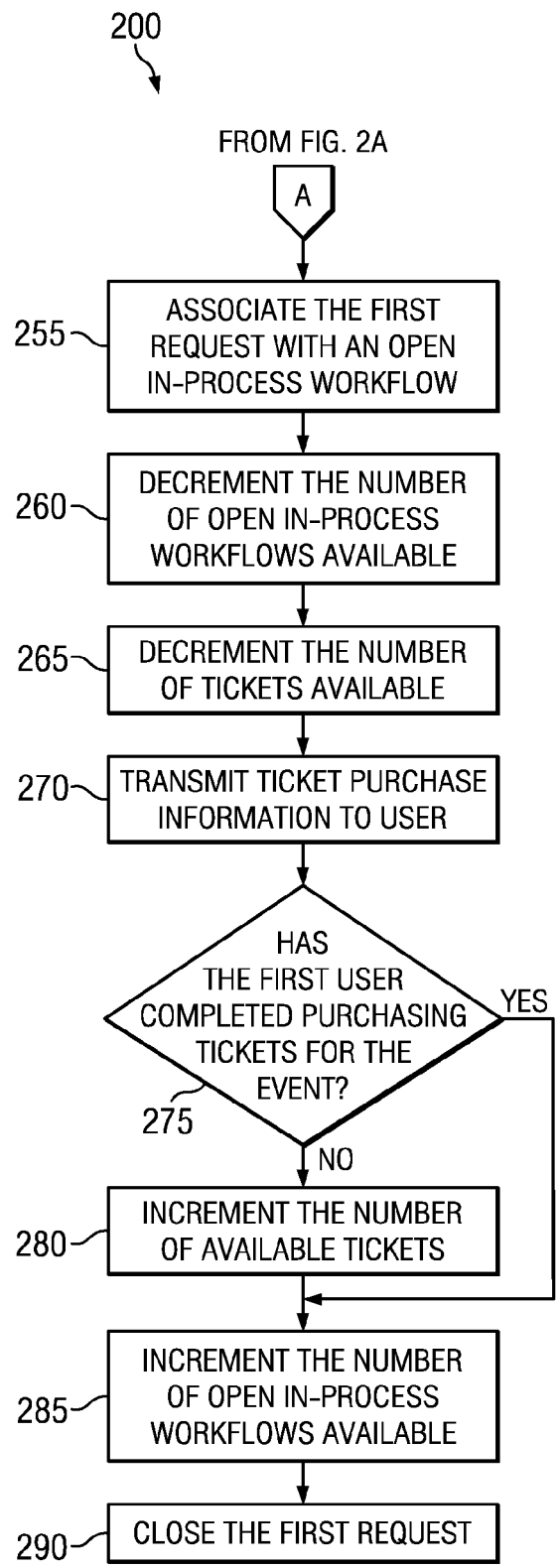

FIGS. 2A-2B illustrate an example method 200 for managing an online ticket purchasing system. Referring to FIG. 2A, the method begins at step 210, where a first user may access an event listing associated with an event on event management system 170. At step 215, event management system 170 may receive a first request to purchase a first number of tickets for the event from the first user. At step 220, event management system 170 may determine whether the number of open in-process workflows is greater than zero. If the number of open in-process workflows is greater than zero, then event management system 170 may associate the first request to purchase tickets with an open in-process workflow at step 255. However, if the number of open in-process workflows is not greater than zero, then event management system 170 may then execute step 225. The total number (or pool) of open in-process workflows can be a parameter that an administrator may configure to limit the number of open sessions at any given time. At step 225, event management system 170 may determine whether the expected cumulative number of tickets sold is greater than the number of tickets available for the event. Event management system 170 may determine the expected cumulative number of tickets sold by applying a probabilistic model that calculates the order success probability for the first request to purchase tickets for the event from the first user and one or more second requests to purchase tickets for the event from one or more second users, respectively. If the expected cumulative number of tickets sold is greater than the number of tickets available, then event management system 170 may associate the first request to purchase ticket with a termination workflow at step 230. However, if the expected cumulative number of tickets sold is not greater than the number of tickets available, then event management system may associate the first request to purchase tickets with a queue workflow at step 235. While the first request to purchase tickets to the event is associated with the queue workflow, event management system 170 may periodically check whether the first request should be transferred to another workflow in loop 250. As an example and not by way of limitation, event management system 170 may implement embedded code (e.g. JavaScript) within a webpage to implement loop 250. The embedded code may cause a client application to periodically transmit requests to the event management system 170 for status updates. The embedded code in loop 250 may facilitate communication between a client system 130 and an event management system 170 to associate requests to purchase tickets from the queue workflow to another workflow. At step 240, event management system 170 may again determine whether the current expected cumulative number of tickets sold is greater than the number of tickets available for the event. If the current expected cumulative number of tickets sold is greater than the number of tickets available, then event management system 170 may associate the first request to purchase ticket with a termination workflow at step 230. However, if the current expected cumulative number of tickets sold is not greater than the number of tickets available, then event management system may execute step 245. At step 245, event management system 170 may determine whether the current number of open in-process workflows is greater than zero. If the current number of open in-process workflows is greater than zero, then event management system 170 may associate the first request to purchase tickets with an open in-process workflow at step 255. However, if the number of open in-process workflows is not greater than zero, then event management system 170 may continue associating the first request with a queue workflow at 235 and loop 250 may repeat.

Now referring to FIG. 2B, at step 255, event management system 170 may associate the first request to purchase tickets to the event with an open in-process workflow, as described above. At step 260, event management system 170 may decrement the number of open in-process workflows in response to the first request being associated with an open in-process workflow. At step 265, event management system 170 may also decrement the current number of tickets available for the event in response to the first request being associated with an open in-process workflow. At step 270, event management system 170 may transmit ticket purchase information to the first user. The ticket purchase information may be received at a client system 130. At step 275, event management system 170 may determine whether the first user has completed purchasing tickets for the event. If the first user has completed purchasing tickets for the event, then event management system 170 may increment the number of open in-process workflows available at step 285 and close the first request at step 290. However, if the first user fails to complete purchasing tickets for the event, then event management system 170 may increment the current number of tickets available for the event at step 280, increment the current number of open in-process workflows available at step 285, and close the first request at step 290. Although this disclosure describes and illustrates particular steps of the method of FIGS. 2A-2B as occurring in a particular order, this disclosure contemplates any suitable steps of the method of FIGS. 2A-2B occurring in any suitable order. Moreover, although this disclosure describes and illustrates particular components carrying out particular steps of the method of FIGS. 2A-2B, this disclosure contemplates any suitable combination of any suitable components carrying out any suitable steps of the method of FIGS. 2A-2B.

In particular embodiments, an event management system 170 may receive a request to purchase a number of tickets for an event from a user 101. As an example and not by way of limitation, the request to purchase tickets to an event may be transmitted from a client system 130. The request may specify a number and type of tickets that the user 101 is requesting to purchase. The request may also contain user information associated with the user 101 or a unique client identifier associated with the user 101 or the client system 130. Although this disclosure describes particular components receiving and transmitting particular requests to purchase tickets, this disclosure contemplates any suitable components receiving and transmitting any suitable requests to purchase tickets.

In particular embodiments, an event management system 170 may associate a request to purchase tickets with a particular workflow based on the application of a probabilistic model. A request may be associated with an in-process workflow, a queue workflow, a termination workflow, or another suitable workflow. The probabilistic model may utilize a variety of factors, such as, for example, the number of tickets requested for an event from the first user, the total number of tickets for the event requested by all other users, the current number of tickets available for the event, the duration that each request to purchase tickets has been associated with a particular workflow, event information for the event, user information for the users 101 corresponding to all pending request to purchase tickets, other suitable factors, or two or more such factors. Although this disclosure describes associating requests to purchase tickets with particular workflows in a particular manner, this disclosure contemplates associating requests to purchase tickets with any suitable workflows in any suitable manner.

In particular embodiments, an event management system 170 may determine a likelihood of success of purchasing the number of requested tickets calculated from the probabilistic model. The likelihood of success of purchasing the number of requested tickets may determine a threshold probability. User requests above the threshold probability may be associated with a queue workflow or an in-process workflow. User requests below the threshold probability may be associated with a termination workflow. Although this disclosure describes associating requests to purchase tickets with particular workflows in a particular manner, this disclosure contemplates associating requests to purchase tickets with any suitable workflows in any suitable manner.

In particular embodiments, an event management system 170 may determine the cumulative number of expected tickets to be purchased. The probabilistic model may calculate the cumulative number of expected tickets to be purchased by one or more users 101 based on the sum of the number of tickets requested by each request multiplied by the order success probability for each request. As an example and not by way of limitation, a first request may be associated with a termination workflow if the first user's expected number of tickets purchased for the event subtracted from the current number of tickets available is less than the cumulative number of expected tickets to be purchased by one or more second users. However, the first request may be associated with a queue workflow if the first user's expected number of tickets purchased for the event subtracted from the current number of tickets available is equal to or greater than the cumulative number of expected tickets to be purchased by the one or more second users. Although this disclosure describes associating requests to purchase tickets with particular workflows in a particular manner, this disclosure contemplates associating requests to purchase tickets with any suitable workflows in any suitable manner.

In particular embodiments, an event management system 170 may determine an order success probability for a request to purchase tickets for an event from a user 101 based on: the duration that the request has been associated with the in-process workflow, queue workflow, or termination workflow; event information associated with the event; user information associated with the user 101; other suitable factors; or two or more such factors. The following is an example algorithm that event management system 170 may use to calculate an order success probability:

$$p_i = f(t_i, E_1, \ldots, E_n, U_{i,1}, \ldots U_{i,m})$$

where:

$p_i$ is the order success probability for a user i, $t_i$ is the duration that user i has been associated with the in-process workflow or queue workflow, $E_1, \ldots, E_n$ are event information 1 through n, and $U_{i,1}, \ldots, U_{i,m}$ are user information 1 through m for a user i.

The following is another example algorithm that event management system 170 may use to calculate an order success probability:

$$p_i = 1 - \exp(-\lambda \cdot t_i)$$

where:

$p_i$ is the order success probability for a user i, $\lambda$ is a fixed variable, and $t_i$ is the duration that user i has been associated with the in-process workflow or queue workflow.

As an example and not by way of limitation, event management system 170 may receive a first request to purchase n1 tickets for an event from a first user and have also received r second requests from r second users, respectively. Each second request may be a request to purchase n2 tickets for the event and each second request may have been previously received and already associated with an in-process workflow or a queue workflow. Event management system 170 may then determine a first order success probability (p1) for the first request and a second order success probability (p2) for each second request. Event management system 170 may then determine if $$\left( \sum_{i=0}^{i \leq r} p2_i \cdot n2_i \right) + (p1 \cdot n1) > T + \varepsilon,$$

wherein T is the current number of tickets available for the event and $\varepsilon$ is a user-defined threshold. If so, then event management system 170 may associate the first request with a termination workflow. Else, event management system 170 may associate the first request with a queue workflow. As another example and not by way of limitation, event management system 170 may receive a first request to purchase 4 tickets (n1=4) for an event from a first user and have also received 3 second requests from 3 second users, respectively (r=3). The 3 second request may be request to purchase 5, 6, and 3 tickets for the event, respectively (n2$_1$=5, n2$_2$=6, n2$_3$=3), and each second request may have been previously received and already associated with an in-process workflow or a queue workflow. The current number of tickets available for the event may be equal to six (T=6). Event management system 170 may then determine a first order success probability of p1=0.33 for the first request. The three second request may have second order success probabilities of 0.20, 0.45, and 0.80, respectively (p2$_1$=0.20, p2$_2$=0.45, p2$_3$=0.80). If the user-defined threshold $\varepsilon$ is equal to zero, then the event management system 170 may then determine if ((0.20·0.5)+ (0.45·6)+(0.80·3))+(0.33·4)>6. Since this is true, then event management system 170 may associate the first request with a termination workflow. If this were not true, event management system 170 may associate the first request with a queue workflow. Although this disclosure describes calculating particular order success probabilities using particular algorithms and particular factors, this disclosure contemplated calculating any suitable order success probabilities using any suitable algorithms and any suitable factors.

Figure 3:
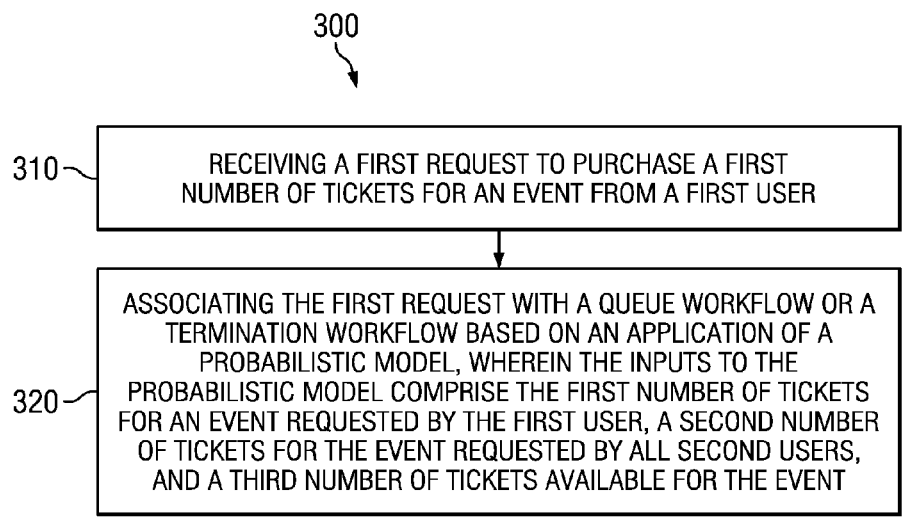
FIG. 3 illustrates an example method for managing requests to purchase tickets.

FIG. 3 illustrates an example method 300 for managing requests to purchase tickets. The method begins at step 310, where event management system 170 may receive a first request to purchase a first number of tickets for an event from a first user. At step 320, event management system 170 may associate the first request with a queue workflow or a termination workflow based on an application of a probabilistic model. The inputs to the probabilistic model may comprise the first number of tickets for the event from the first user, a second number of tickets for the event that all second users are requesting to purchase, and a third number of tickets available for the event. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates particular components carrying out particular steps of the method of FIG. 3, this disclosure contemplates any suitable combination of any suitable components carrying out any suitable steps of the method of FIG. 3.

Systems and Methods

Figure 4:
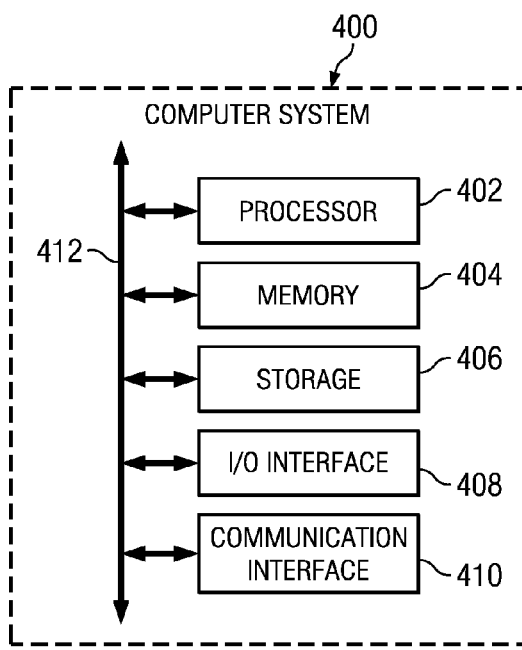
FIG. 4 illustrates an example computer system.

FIG. 4 illustrates an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include an HDD, a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 402 (such as, for example, one or more internal registers or caches), one or more portions of memory 404, one or more portions of storage 406, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in Hyper Text Markup Language (HTML), Extensible Markup Language (XML), or other suitable markup language.

Figure 5:
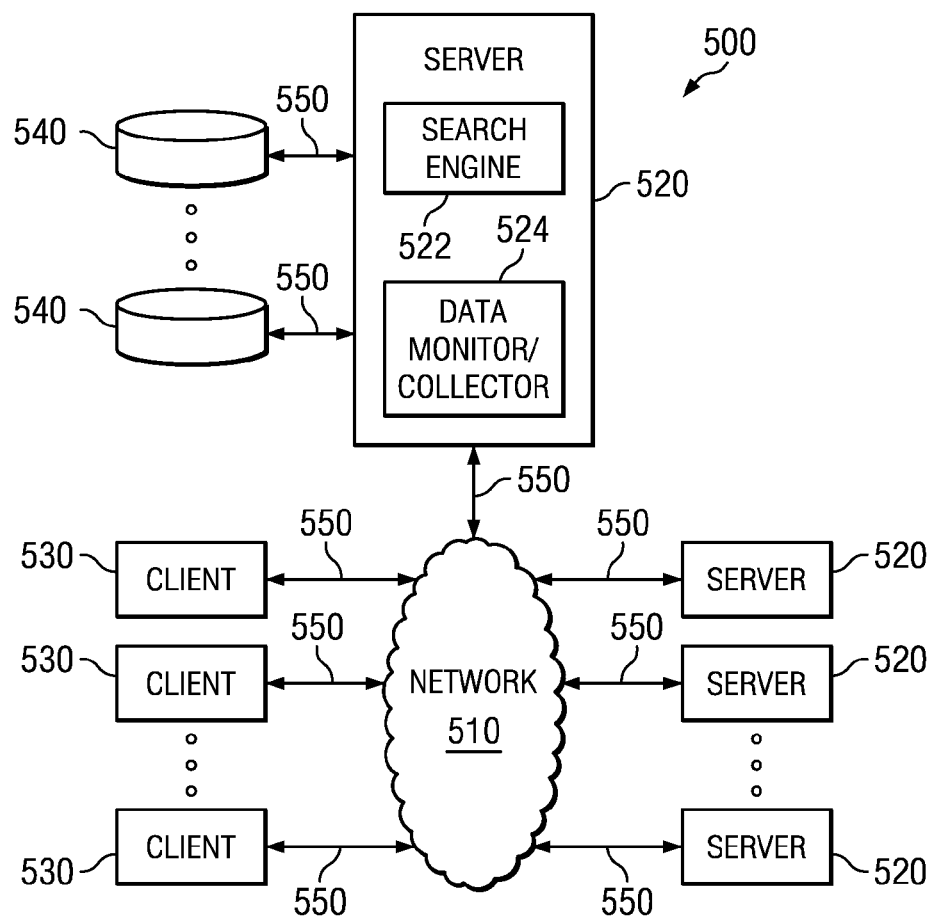
FIG. 5 illustrates an example network environment.

FIG. 5 illustrates an example network environment 500. This disclosure contemplates any suitable network environment 500. As an example and not by way of limitation, although this disclosure describes and illustrates a network environment 500 that implements a client-server model, this disclosure contemplates one or more portions of a network environment 500 being peer-to-peer, where appropriate. Particular embodiments may operate in whole or in part in one or more network environments 500. In particular embodiments, one or more elements of network environment 500 provide functionality described or illustrated herein. Particular embodiments include one or more portions of network environment 500. Network environment 500 includes a network 510 coupling one or more servers 520 and one or more clients 530 to each other. This disclosure contemplates any suitable network 510. As an example and not by way of limitation, one or more portions of network 510 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 510 may include one or more networks 510.

Links 550 couple servers 520 and clients 530 to network 510 or to each other. This disclosure contemplates any suitable links 550. As an example and not by way of limitation, one or more links 550 each include one or more wireline (such as, for example, Digital Subscriber Line (DSL) or Data Over Cable Service Interface Specification (DOCSIS)), wireless (such as, for example, Wi-Fi or Worldwide Interoperability for Microwave Access (WiMAX)) or optical (such as, for example, Synchronous Optical Network (SONET) or Synchronous Digital Hierarchy (SDH)) links 550. In particular embodiments, one or more links 550 each includes an intranet, an extranet, a VPN, a LAN, a WLAN, a WAN, a MAN, a communications network, a satellite network, a portion of the Internet, or another link 550 or a combination of two or more such links 550. Links 550 need not necessarily be the same throughout network environment 500. One or more first links 550 may differ in one or more respects from one or more second links 550.

This disclosure contemplates any suitable servers 520. As an example and not by way of limitation, one or more servers 520 may each include one or more advertising servers, applications servers, catalog servers, communications servers, database servers, exchange servers, fax servers, file servers, game servers, home servers, mail servers, message servers, news servers, name or DNS servers, print servers, proxy servers, sound servers, standalone servers, web servers, or web-feed servers. In particular embodiments, a server 520 includes hardware, software, or both for providing the functionality of server 520. As an example and not by way of limitation, a server 520 that operates as a web server may be capable of hosting websites containing web pages or elements of web pages and include appropriate hardware, software, or both for doing so. In particular embodiments, a web server may host HTML or other suitable files or dynamically create or constitute files for web pages on request. In response to a Hyper Text Transfer Protocol (HTTP) or other request from a client 530, the web server may communicate one or more such files to client 530. As another example, a server 520 that operates as a mail server may be capable of providing e-mail services to one or more clients 530. As another example, a server 520 that operates as a database server may be capable of providing an interface for interacting with one or more data stores (such as, for example, data stores 540 described below). Where appropriate, a server 520 may include one or more servers 520; be unitary or distributed; span multiple locations; span multiple machines; span multiple datacenters; or reside in a cloud, which may include one or more cloud components in one or more networks.

In particular embodiments, one or more links 550 may couple a server 520 to one or more data stores 540. A data store 540 may store any suitable information, and the contents of a data store 540 may be organized in any suitable manner. As an example and not by way or limitation, the contents of a data store 540 may be stored as a dimensional, flat, hierarchical, network, object-oriented, relational, XML, or other suitable database or a combination or two or more of these. A data store 540 (or a server 520 coupled to it) may include a database-management system or other hardware or software for managing the contents of data store 540. The database-management system may perform read and write operations, delete or erase data, perform data deduplication, query or search the contents of data store 540, or provide other access to data store 540.

In particular embodiments, one or more servers 520 may each include one or more search engines 522. A search engine 522 may include hardware, software, or both for providing the functionality of search engine 522. As an example and not by way of limitation, a search engine 522 may implement one or more search algorithms to identify network resources in response to search queries received at search engine 522, one or more ranking algorithms to rank identified network resources, or one or more summarization algorithms to summarize identified network resources. In particular embodiments, a ranking algorithm implemented by a search engine 522 may use a machine-learned ranking formula, which the ranking algorithm may obtain automatically from a set of training data constructed from pairs of search queries and selected Uniform Resource Locators (URLs), where appropriate.

In particular embodiments, one or more servers 520 may each include one or more data monitors/collectors 524. A data monitor/collection 524 may include hardware, software, or both for providing the functionality of data collector/collector 524. As an example and not by way of limitation, a data monitor/collector 524 at a server 520 may monitor and collect network-traffic data at server 520 and store the network-traffic data in one or more data stores 540. In particular embodiments, server 520 or another device may extract pairs of search queries and selected URLs from the network-traffic data, where appropriate.

This disclosure contemplates any suitable clients 530. A client 530 may enable a user at client 530 to access or otherwise communicate with network 510, servers 520, or other clients 530. As an example and not by way of limitation, a client 530 may have a web browser, such as MICROSOFT INTERNET EXPLORER or MOZILLA FIREFOX, and may have one or more add-ons, plug-ins, or other extensions, such as GOOGLE TOOLBAR or YAHOO TOOLBAR. A client 530 may be an electronic device including hardware, software, or both for providing the functionality of client 530. As an example and not by way of limitation, a client 530 may, where appropriate, be an embedded computer system, an SOC, an SBC (such as, for example, a COM or SOM), a desktop computer system, a laptop or notebook computer system, an interactive kiosk, a mainframe, a mesh of computer systems, a mobile telephone, a PDA, a netbook computer system, a server, a tablet computer system, or a combination of two or more of these. Where appropriate, a client 530 may include one or more clients 530; be unitary or distributed; span multiple locations; span multiple machines; span multiple datacenters; or reside in a cloud, which may include one or more cloud components in one or more networks.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context. Furthermore, "a", "an", or "the" is intended to mean "one or more," unless expressly indicated otherwise or indicated otherwise by context. Therefore, herein, "an A" or "the A" means "one or more A," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, this disclosure encompasses any suitable combination of one or more features from any example embodiment with one or more features of any other example embodiment herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising, by one or more computing devices:
   receiving a first request to purchase n1 tickets for an event from a first user; and
   associating the first request with a queue workflow or a termination workflow based on an application of a probabilistic model, wherein the probabilistic model determines an order of success probability for purchasing a particular number of tickets for the event, and wherein inputs to the probabilistic model comprise:
   n1;
   a total number of tickets for the event that r second requests from r second users, respectively, are requesting to purchase; and
   a current number of tickets available for the event (T).

2. The method of claim 1, further comprising:
   if the probabilistic model returns an order of success probability for purchasing n1 tickets above a threshold probability, then associating the first request with the queue workflow;
   else associating the first request with the termination workflow.

3. The method of claim 1, wherein if a number of open in-process workflows is greater than zero, then associating the first request with an open in-process workflow.

4. The method of claim 1, wherein the number of open in-process workflows is equal to a process limit minus a number of second requests associated with an in-process workflow.

5. The method of claim 3, further comprising:
   if associating the first request with the in-process workflow, then decrementing the number of open in-process workflows.

6. The method of claim 3, further comprising:
   if associating the first request to the in-process workflow, then transmitting ticket purchase information to the first user.

7. The method of claim 1, wherein associating the first request with the queue workflow or the termination workflow based on the application of the probabilistic model comprises:
   accessing r second requests from r second users, respectively, wherein each second request is to purchase n2 tickets for the event and each second request is associated with an in-process workflow or a queue workflow;
   determining a first order success probability (p1) for the first request;
   determining a second order success probability (p2) for each second request; and
   if $$\left(\sum_{i=0}^{i \le r} p2_i \cdot n2_i\right) + (p1 \cdot n1) > T + \varepsilon,$$

wherein ε is a user-defined threshold, then associating the first request with the termination workflow;
   else, associating the first request with the queue workflow.

8. The method of claim 7, further comprising:
   periodically updating one or more of the current number of tickets available for the event, the number of open in-process workflows, the first order success probability, or the second order success probability.

9. The method of claim 7, wherein the second order success probability for each second request is based on a duration that the second request has been associated with the in-process workflow or the queue workflow.

10. The method of claim 9, wherein the second order success probability for each second request is further based on one or more of an event information for the event or an user information for the second user corresponding to the second request.

11. The method of claim 7, wherein $p2_i = 1 - \exp(-\lambda \cdot t_i)$, wherein $t_i$ is a duration that the second request has been associated with the queue workflow.

12. An apparatus comprising: one or more processors; and a memory coupled to the processors comprising instructions executable by the processors, the processors operable when executing the instructions to:
receive a first request to purchase n1 tickets for an event from a first user; and
associate the first request with a queue workflow or a termination workflow based on an application of a probabilistic model, wherein the probabilistic model determines an order success probability for purchasing a particular number of tickets from the event, and wherein the inputs to the probabilistic model comprise:
n1;
a total number of tickets for the event that r second requests from r second users, respectively, are requesting to purchase; and
a current number of tickets available for the event (T).

13. One or more computer-readable non-transitory storage media embodying software that is operable when executed to:
receive a first request to purchase n1 tickets for an event from a first user; and
associate the first request with a queue workflow or a termination workflow based on an application of a probabilistic model, wherein the probabilistic model determines an order success probability for purchasing a particular number of tickets from the event, and wherein the inputs to the probabilistic model comprise:
n1;
a total number of tickets for the event that r second requests from r second users, respectively, are requesting to purchase; and
a current number of tickets available for the event (T).

14. The method of claim 1, further comprising:
if associating the first request with the termination workflow, then transmitting a message to the first user that tickets are not available for the event.

15. The method of claim 1, further comprising:
if associating the first request with the queue workflow, then transmitting to the first user a wait time before entering the in-process workflow.

16. The method of claim 1, further comprising:
if associating the first request with the queue workflow, then transmitting a message to the first user indicating the queue placement of the first user.

17. The method of claim 3, further comprising:
if associating the first request with the open in-process, then directing the first user to a webpage for purchasing tickets for the event.

18. The method of claim 3, wherein if the user has been in the in-process workflow for greater than a threshold time period, then transferring the first request to the termination workflow.

* * * * *